(12) United States Patent
Park

(10) Patent No.: US 11,578,910 B2
(45) Date of Patent: Feb. 14, 2023

(54) REFRIGERATOR AND METHOD FOR CONTROLLING REFRIGERATOR WITH IMPROVED COOLING MANAGEMENT

(71) Applicant: LG ELECTRONICS INC., Seoul (KR)

(72) Inventor: Yun Sik Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 301 days.

(21) Appl. No.: 15/930,129

(22) Filed: May 12, 2020

(65) Prior Publication Data

US 2021/0207884 A1 Jul. 8, 2021

(30) Foreign Application Priority Data

Jan. 6, 2020 (KR) .................. 10-2020-0001371

(51) Int. Cl.
*F25D 29/00* (2006.01)
*F25D 11/02* (2006.01)
*F25B 49/02* (2006.01)

(52) U.S. Cl.
CPC ............ *F25D 29/00* (2013.01); *F25B 49/022* (2013.01); *F25D 11/02* (2013.01); *F25B 2600/0253* (2013.01); *F25D 2400/361* (2013.01); *F25D 2500/04* (2013.01); *F25D 2500/06* (2013.01); *F25D 2600/04* (2013.01); *F25D 2600/06* (2013.01); *F25D 2700/06* (2013.01)

(58) Field of Classification Search
CPC .. F25D 29/00; F25D 2500/04; F25D 2500/06; F25D 2700/06
See application file for complete search history.

(56) References Cited

U.S. PATENT DOCUMENTS

| | | | |
|---|---|---|---|
| 8,457,795 B1 * | 6/2013 | Rubin | F25D 29/003 700/275 |
| 2007/0227161 A1 * | 10/2007 | Boer | F25D 29/00 62/172 |
| 2015/0226475 A1 * | 8/2015 | Choi | F25D 29/00 62/158 |
| 2018/0335252 A1 * | 11/2018 | Oh | G06V 20/20 |

FOREIGN PATENT DOCUMENTS

| | | |
|---|---|---|
| KR | 1995-0025388 A | 9/1995 |
| KR | 10-2007-0075669 A | 7/2007 |
| WO | WO-2012090209 A2 * | 7/2012 ............ F25D 25/00 |

* cited by examiner

*Primary Examiner* — Jonathan Bradford
(74) *Attorney, Agent, or Firm* — Birch, Stewart, Kolasch & Birch, LLP

(57) ABSTRACT

A refrigerator can include a storage compartment having a storage space and an opening; at least one door coupled to the storage compartment to open and close a part of the storage compartment; a compressor configured to provide the storage compartment with freezing capacity or cooling capacity; a processor configured to control driving of the compressor; and a memory operably connected to the processor and configured to store code to cause the processor to in response to recognizing placement of an item in the storage space, determine whether the item is an overload item to generate a determination result; and control the driving of the compressor to adjust a temperature of the storage space based on the determination result.

16 Claims, 7 Drawing Sheets

REFRIGERATOR AND METHOD FOR CONTROLLING REFRIGERATOR WITH IMPROVED COOLING MANAGEMENT

CROSS-REFERENCE TO RELATED APPLICATION

This present application claims the benefit of priority to Korean Patent Application No. 10-2020-0001371, entitled "REFRIGERATOR AND METHOD FOR CONTROLLING REFRIGERATOR," filed on Jan. 6, 2020, in the Republic of Korea, the entirety of which is incorporated herein by reference.

BACKGROUND

1. Technical Field

The present disclosure relates to a refrigerator controlling the temperature of a storage space thereof and a method for operating the same.

2. Description of Related Art

Generally, a refrigerator is a home appliance that allows low-temperature storage of food in a storage space therein that is closed by a door. To this end, the refrigerator is configured to cool the inside of the storage space by using cooling air which is generated through heat exchange with refrigerants circulating in a refrigeration cycle, to thereby keep the stored food in optimal condition.

However, if a food item having a relatively high temperature is placed in the storage space of the refrigerator or a large amount of food is added to the storage space, the temperature of the storage space rapidly increases, which makes it difficult to keep the food in optimal condition.

Korean Patent Application Publication No. 10-2007-0075669 (hereinafter referred to as "related art 1") discloses a technology that provides a mode for adjusting a supercooling degree of a liquid beverage stored in a refrigerator, thus allowing a user to select and adjust the supercooling degree according to his or her preference or the type of the liquid beverage.

Korean Patent Application Publication No. 10-1995-0025388 (hereinafter referred to as "related art 2") discloses a technology for determining a load degree based on the difference in temperature between a cooling air outlet and a cooling air inlet of the freezer or the refrigerator, and adjusting the amount of cooling air based on the determined load degree.

However, in related arts 1 and 2, it is not considered whether each item (that is, food) is an overload item. For this reason, related arts 1 and 2 have limitations in adjusting the temperature of the storage space in accordance with each item placed in the storage space.

Accordingly, a technique of adjusting the temperature of the storage space in accordance with the item that has just been placed in the storage space is required.

SUMMARY OF THE INVENTION

An aspect of the present disclosure is directed to providing a refrigerator and a method for operating the same, characterized by determining whether an item that has just been placed in the storage space of the refrigerator is an overload item and, based on a result of the determination, adjusting the temperature of the storage space.

Another aspect of the present disclosure is directed to providing a refrigerator and a method for operating the same, characterized in that whether an item that has just been placed in the storage space is an overload item is immediately determined by using a pre-trained machine learning-based overload item determination model.

Yet another aspect of the present disclosure is directed to providing a refrigerator and a method for operating the same, characterized in that whether an item that has just been placed in the storage space is an overload item is rapidly determined (at an early overload determination time) based on a temperature change in the storage space over a predetermined period of time starting from a time point when the item is placed in the storage space.

Yet another aspect of the present disclosure is directed to providing a refrigerator and a method for operating the same, characterized by, based on a determination that the item that has just been placed in the storage space is an overload item, quickly controlling the drive of a compressor that provides the storage space with freezing capacity to lower the temperature of the storage space. By doing so, the temperature of the storage space may be prevented from rapidly increasing due to the overload item, and other items in the storage space, as well as the overload item, may be kept in optimal condition.

Yet another aspect of the present disclosure is directed to providing a refrigerator and a method for operating the same, characterized by predicting opening and closing of the door of the refrigerator based on a door opening and closing pattern model and, before the predicted time of opening and closing of the door, preemptively lowering the temperature of the storage space by controlling the driving of the compressor that provides the storage space with freezing capacity, to thereby reduce the impact of the temperature change in the storage space caused by the opening and closing of the door.

Yet another aspect of the present disclosure is directed to providing a refrigerator and a method for operating the same, characterized by checking a time interval during which the door is not opened for more than a predetermined period of time (e.g., night time) based on the door opening and closing pattern model, and driving the compressor to be in a sleep mode during the time interval, to thereby save energy.

According to an embodiment of the present disclosure, a refrigerator may adjust the temperature of storage space thereof based on whether or not an item that has just been placed in the refrigerator is an overload item.

According to an embodiment of the present disclosure, a refrigerator may include: a storage compartment which forms storage space and of which the front is open; at least one door coupled to the front of the storage compartment to open and close a part of the storage compartment; a compressor configured to provide the storage compartment with freezing capacity; a processor configured to control driving of the compressor; and a memory operably connected to the processor and configured to store at least one code that is executed by the processor, wherein the memory stores a code that, when executed by the processor, causes the processor to, in response to recognizing placement of an item in the storage space, determine whether or not the item is an overload item and, based on a result of the determination, control the driving of the compressor in order to adjust the temperature of the storage space.

According to another embodiment of the present disclosure, a method for controlling a refrigerator including a processor may include: in the processor, in response to recognizing placement of an item in a storage space in a storage compartment to which a door is coupled, determining whether or not the item is an overload item; and in the processor, based on a result of the determination, controlling driving of a compressor that provides the storage compartment with freezing capacity, in order to adjust the temperature of the storage space.

Apart from those described above, another method and another system for implementing the present disclosure, and a non-transitory computer-readable recording medium having a computer program stored therein to perform the method may be further provided.

Other aspects and features in addition to those described above will become clear from the accompanying drawings, the claims, and the detailed description of the present disclosure.

According to embodiments of the present disclosure, the cooling efficiency of the refrigerator may be improved, and energy may be saved.

According to the embodiments of the present disclosure, in response to recognizing placement of an item in the storage space of the refrigerator, it may be determined whether the item is an overload item, and based on the result of the determination, the temperature of the storage space may be adjusted.

According to the embodiments of the present disclosure, it may be immediately determined whether or not an item that has just been placed in the storage space of the refrigerator is an overload item by using a pre-trained machine learning-based overload item determination model.

According to the embodiments of the present disclosure, it may be rapidly determined (at an early overload determination time) whether or not an item that has just been placed in the storage space is an overload item based on a temperature change in the storage space over a predetermined period of time starting from a time point when the item is placed in the storage space.

According to the embodiments of the present disclosure, based on a determination that the item that has just been placed in the storage space is an overload item, the driving of the compressor that provides the storage space with freezing capacity may be quickly controlled, to thereby prevent the temperature of the storage space from rapidly increasing due to the overload item, and other items in the storage space, as well as the overload item, may be kept in optimal condition.

According to the present disclosure, opening and closing of the door of the refrigerator may be predicted based on a door opening and closing pattern model, and before a predicted time of opening and closing of the door, the temperature of the storage space may be preemptively lowered by controlling the driving of the compressor that provides the storage space with freezing capacity, to thereby reduce the impact of the temperature change caused by the opening and closing of the door.

According to the present disclosure, a time interval during which the door is not opened for more than a predetermined period of time (e.g., at night) may be checked based on the door opening and closing pattern model, and the compressor may be driven to be in a sleep mode during the time period, to thereby save energy.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an example embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION OF THE EMBODIMENTS

Figure 1:
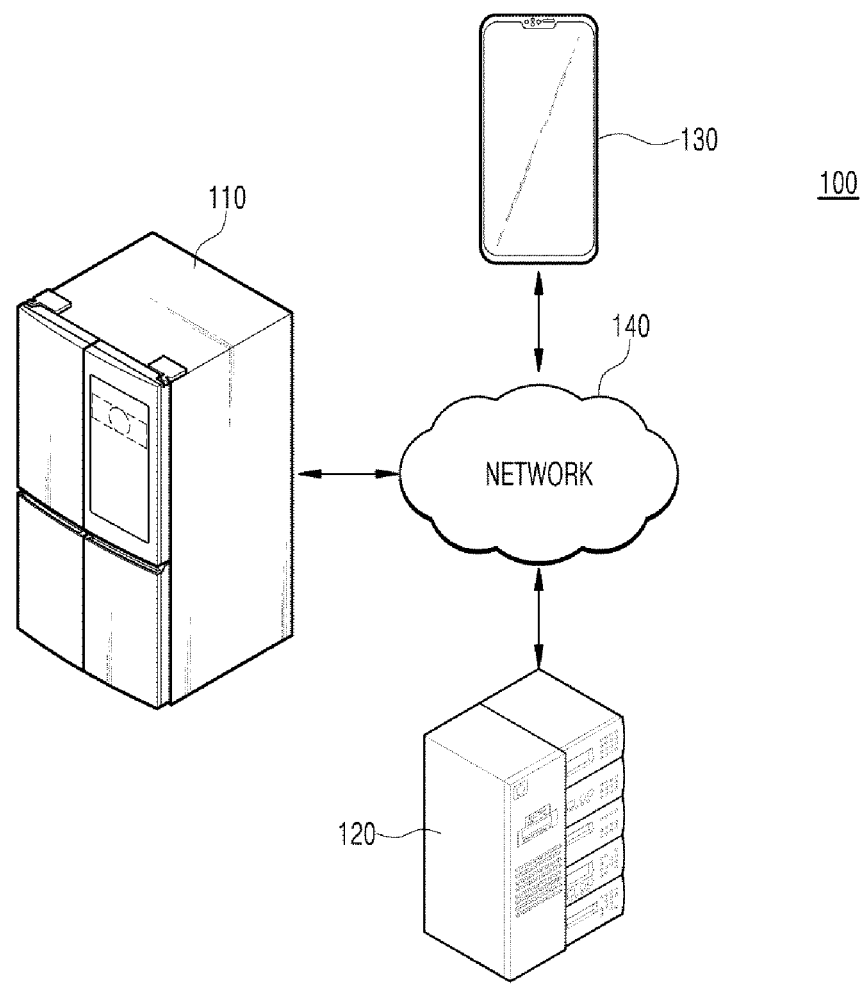
FIG. 1 illustrates a refrigerator system environment including a refrigerator, a server, a user terminal, and a network connecting the refrigerator, the server, and the user terminal according to an embodiment of the present disclosure.

Advantages and features of the present disclosure and methods of achieving the advantages and features will be more apparent with reference to the following detailed description of embodiments in connection with the accompanying drawings. However, the description of particular embodiments is not intended to limit the present disclosure to the particular embodiments disclosed herein, but on the contrary, it should be understood that the present disclosure is to cover all modifications, equivalents and alternatives falling within the spirit and scope of the present disclosure. The embodiments disclosed below are provided so that this disclosure will be thorough and complete and will fully convey the scope of the present disclosure to those skilled in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. It must be noted that as used herein and in the appended claims, the singular forms "a," "an,"

and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," "second," and other numerical terms, are used only to distinguish one element from another element. These terms are generally only used to distinguish one element from another.

The shapes, sizes, ratios, angles, the number of elements given in the drawings are merely examples, and thus, the present disclosure is not limited to the illustrated details. Like reference numerals designate like elements throughout the specification.

In relation to describing the present disclosure, when the detailed description of the relevant known technology is determined to unnecessarily obscure the gist of the present disclosure, the detailed description may be omitted.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "or" as used herein is to be interpreted as an inclusive or meaning any one or any combination. Therefore, "A, B or C" means any of the following: "A; B; C; A and B; A and C; B and C; A, B and C." An exception to this definition will occur only when a combination of elements, functions, steps or acts are in some way inherently mutually exclusive.

Hereinafter, embodiments of the present disclosure will be described in detail with reference to the accompanying drawings. Like reference numerals designate like elements throughout the specification, and overlapping descriptions of the elements will be omitted.

FIG. 1 illustrates a refrigerator system environment including a refrigerator, a server, a user terminal, and a network connecting the refrigerator, the server, and the user terminal according to an embodiment of the present disclosure.

Referring to FIG. 1, a refrigerator system environment 100 may include a refrigerator 110, a server 120, a user terminal 130, and a network 140.

The refrigerator 110 may be a home appliance that can store food at a low temperature in an internal storage space that is closed by a first door to a fourth door. The refrigerator 110 may be configured to cool the inside of the storage space by using cooling air generated through heat exchange with refrigerants circulating in a refrigeration cycle, to thereby keep the stored food in optimal condition.

The refrigerator 110 may, in response to recognizing placement of an item in the storage space, determine whether or not the item is an overload item and, based on a result of the determination, adjust the temperature of the storage space.

As an example of the determination of whether or not the item is an overload item, the refrigerator 110 may generate an image by capturing the item that has just been placed in the storage space using a camera that is provided in the refrigerator 110, and based on a result of applying a pre-trained machine learning-based overload item determination model to the image, determine whether or not the item is an overload item. Here, the camera may be provided, for example, in at least one of a first door, a second door, or the storage space in the refrigerator 110.

The overload item determination model may be a machine learning-based learning model that is pre-trained to determine whether the item is an overload item and the overload degree of the item based on a temperature change in the storage space over a predetermined period of time, using more than a preset number of images of items as training data. The overload item determination model may be a learning model based on, for example, a deep neural network (DNN), a convolutional neural network (CNN), and a long short-term memory recurrent neural network (LSTM-RNN).

Here, the refrigerator 110 may determine whether the item that has just been placed in the storage space is an overload item by applying, to the captured image of the item, an overload item determination model that is pre-stored in a memory of the refrigerator 110, but the scope of the present disclosure is not limited thereto. For example, the refrigerator 110 may determine whether the item is an overload item by applying, to the captured image, an overload item determination model that is received from the server 120 in response to a request for an overload item determination model sent to the server 120. In addition, the refrigerator 110 may send the captured image of the item to the server 120 and receive, from the server 120, only the result of a determination of whether the item is an overload item.

As an example of the determination of whether the item is an overload item, the refrigerator 110 may determine whether or not the item is an overload item based on a temperature change in the storage space over a predetermined period of time (for example, three minutes) starting from a time point when the placement of the item was recognized. For example, the refrigerator 110 may determine that the item is not an overload item based on confirming that a change in temperature in the storage space over a predetermined period of time starting from the time point when the placement of the item was recognized falls within a present control temperature range. By contrast, from the time point when the placement of the item was recognized, the temperature of the storage space may be temporarily increased for a preset time period, but based on a determination that the changed temperature of the storage space does not fall within the preset control temperature range and the temperature of the storage space has increased beyond a reference temperature for determining an overload item, the refrigerator 110 may determine that the item is an overload item.

Meanwhile, the refrigerator 110 may generate an image by capturing the item that has just been placed in the storage space using a camera provided in the refrigerator 110, but the scope of the present disclosure is not limited thereto, and the refrigerator 110 may also receive, from the user terminal 130, a captured image of the item to be placed in the storage space.

The server 120 may be, for example, an artificial intelligence (AI) server and a database server which provides big data that is necessary for applying an artificial intelligence algorithm (for example, the overload item determination model), and a variety of service information based on the big data. In addition, the server 120 may include an application server that provides the user terminal 130 with an application that can communicate with the refrigerator 110 or a web server that provides the user terminal 130 with a web site that can communicate with the refrigerator 110.

Here, artificial intelligence (AI) refers to a field of studying artificial intelligence or a methodology for creating the same. Moreover, machine learning refers to a field of defining various problems dealt with in an artificial intelligence field and studying methodologies for solving the same. Machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer and an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weights of synapse connections, biases of neurons, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

Machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and deep learning is one machine learning technique.

The server 120, which is an AI server, may train the overload item determination model through machine learning to determine whether an item is an overload item and the overload degree of the item based on a temperature change in the storage space over a predetermined period of time, using more than a preset number of images of items as training data.

The server 120 may, in response to a request from the refrigerator 110, provide the refrigerator 110 with the overload item determination model, and the overload item determination model may then be applied to the captured image of the item that has just been placed in the storage space of the refrigerator 110.

As another example, the server 120 may apply the overload item determination model to a captured image of the item that is received from the refrigerator 110, determine whether the item is an overload item, and then provide the refrigerator 110 with a result of the determination.

The user terminal 130 may be provided with an application that can communicate with the refrigerator 110 by the server 120 (or an application server), or may access a web site that can communicate with the refrigerator 110, and then after going through an authentication process, may communicate with the refrigerator 110.

In the present embodiment, the user terminal 130 may be a desktop computer, a smartphone, a notebook, a tablet PC, a smart TV, a mobile phone, a personal digital assistant (PDA), a laptop, a media player, a micro-server, a global positioning system (GPS) device, an electronic book terminal, a digital broadcasting terminal, a navigation, a kiosk, an MP3 player, a digital camera, a home appliance, and other mobile or immobile computing devices which are operated by a user, but is not limited thereto. Furthermore, the user terminal 130 may be a wearable terminal having a communication function and a data processing function, such as a watch, glasses, a hair band, a ring, or the like. The user terminal 130 is not limited to the aforementioned items, but may be any terminal capable of web-browsing.

The network 140 may connect the refrigerator 110, the server 120, and the user terminal 130 to each other. The network 140 may include, but is not limited to, wired networks such as local area networks (LANs), wide area networks (WANs), metropolitan area networks (MANs), and integrated service digital networks (ISDNs), or wireless networks such as wireless LANs, CDMA, Bluetooth, satellite communications, and the like. Also, the network 140 may transmit or receive data by using short distance communication and/or long distance communication. The short distance communication may include Bluetooth®, radio frequency identification (RFID), infrared data association (IrDA), ultra-wideband (UWB), ZigBee, and wireless-fidelity (Wi-Fi) technologies, and the long-range communication may include code division multiple access (CDMA), frequency division multiple access (FDMA), time division multiple access (TDMA), orthogonal frequency division multiple access (OFDMA), and single carrier frequency division multiple access (SC-FDMA).

The network 140 may include connection of network elements, such as hubs, bridges, routers, switches, and gateways. The network 140 may include one or more connected networks, including a public network such as the Internet and a private network such as a secure corporate private network. For example, the network 140 may include a multi-network environment. Access to the network 140 may be provided through one or more wired or wireless access networks. Furthermore, the network 140 may support 5G communications and/or an Internet of things (IoT) network for exchanging and processing information between distributed components such as objects.

Figure 2:
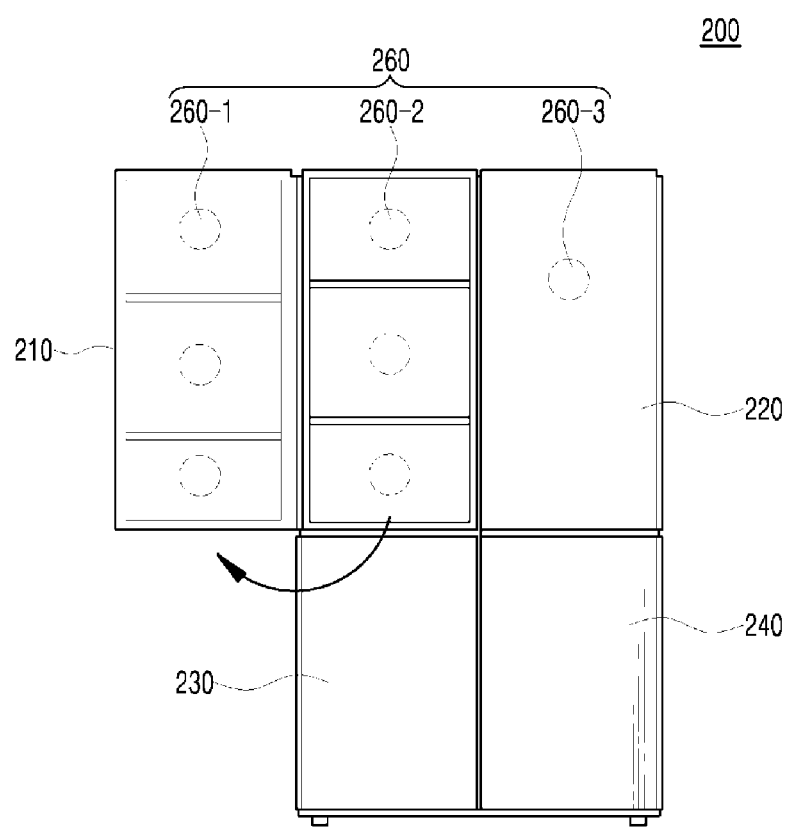
FIG. 2 schematically illustrates the structure of a refrigerator and the position of a camera provided in the refrigerator according to an embodiment of the present disclosure.

FIG. 2 schematically illustrates the structure of a refrigerator and the position of a camera provided in the refrigerator according to an embodiment of the present disclosure.

Referring to FIG. 2, a refrigerator 200 may include a first door (a left door, 210) and a second door (a right door, 220), which are doors for opening and closing a refrigerator compartment, and a third door (a left door, 230) and a fourth door (a right door, 240), which are doors for opening and closing a freezer compartment. As doors of the refrigerator compartment, the first door 210 and the second door 220 may be configured to open and close the front of the refrigerator compartment, which is open, through rotation. As doors of the freezer compartment, the third door 230 and the fourth door 240 may be configured to open and close the front of the freezer compartment, which is open, through rotation. In the present embodiment, the third door 230 and/or the fourth door 240 may be designed to be drawable in the form of a drawer when necessary, and may be provided as a single drawer or as multiple drawers.

The embodiment of the present disclosure describes, as an example, a bottom freezer-type refrigerator with French-type doors, in which a pair of doors are rotated to open and close a single compartment, but the present disclosure may be applied to any type of refrigerator in which one or more doors are provided, regardless of the shape of the refrigerator.

The refrigerator 200 may, for example, have a camera 260 in at least one of the first door 210, the second door 220, or a storage space therein. Specifically, the refrigerator 200 may have at least one camera 260-1 inside the first door 210 and may have at least one camera 260-2 in the storage space therein. In addition, the refrigerator 200 may have at least one camera 260-3 outside the second door 220.

Further, each of the first door 210 and the second door 220 may be configured, for example, to be opened and closed in a dual manner. In detail, the first door 210 and the second door 220 may include a main door for opening and closing the refrigerator compartment, and a sub-door which is rotatably disposed in the main door for opening and closing an opening formed in the main door.

The first door 210 to the fourth door 240 may be rotatably installed in a cabinet, and a gasket may be provided between the cabinet and each of the first door 210 to the fourth door 240. When the first door 210 to the fourth door 240 are closed, the gasket may tightly fill the space between each of the first door 210 to the fourth door 240 and the cabinet, to thereby prevent the cooling air of the refrigerator compartment and the freezer compartment from leaking out. As the adhering force of the gasket increases, the effect of preventing the leakage of the cooling air may increase. In order to increase the adhering force of the gasket, the gasket may be formed of a rubber magnet, or a magnet may be provided within the gasket. When a user pulls one of the first door 210 to the fourth door 240 with a force greater than the sum of the adhering force of the gasket, the magnetic force of the gasket, and the elastic force of a spring, the one of the first door 210 to the fourth door 240 may be opened.

Figure 3:
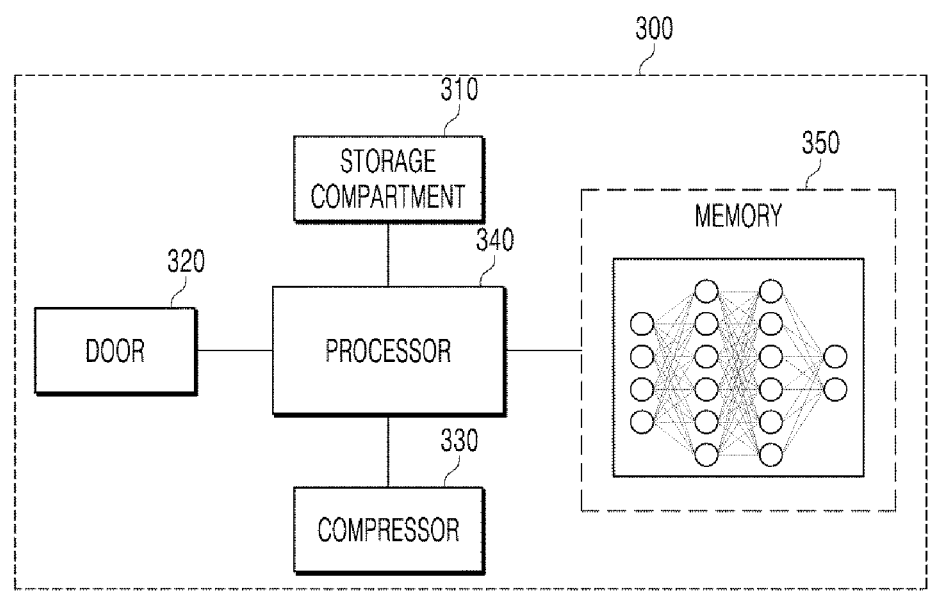
FIG. 3 is a block diagram schematically illustrating the configuration of a refrigerator according to an embodiment of the present disclosure.

FIG. 3 is a block diagram schematically illustrating the configuration of a refrigerator according to an embodiment of the present disclosure.

Referring to FIG. 3, a refrigerator 300 may include a storage compartment 310, a door 320, a compressor 330, a processor 340, and a memory 350.

The storage compartment 310 may form storage space, and the front of the storage compartment 310 may be open.

The door 320 may be at least one door, and may be coupled to the front of the storage compartment 310 to open and close a part of the storage compartment 310.

The compressor 330 may provide the storage compartment 310 with freezing capacity. Here, the processor 340 may change a drive frequency for driving the compressor 300, to thereby adjust the freezing capacity of the compressor 330. Here, for example, as the drive frequency increases, the compressor 330 may provide stronger freezing capacity.

The processor 340 may control the driving of the compressor 330. In detail, the processor 340 may, in response to recognizing placement of an item in the storage compartment 310, determine whether or not the item is an overload item, and based on a result of the determination, control the driving of the compressor 330 in order to adjust the temperature of the storage space, to thereby adjust the temperature of the storage space to correspond to each item that is added to the storage space.

The processor 340 may generate an image by capturing the item through a camera mounted in the storage compartment 310 and the door 320, or may receive an image of the item from a user terminal, and then based on a result of applying a pre-trained machine learning-based overload item determination model to the image, determine whether or not the item is an overload item. Here, the processor 340 may obtain the overload item determination model from the memory 350 or a server.

According to an embodiment, the overload item determination model may be a machine learning-based learning model which is pre-trained using training data in which images of various kinds of items are labeled as an overload item or in which images of various kinds of items are labelled to indicate a temperate change in the storage space when the corresponding items are added the refrigerator.

As another example, the processor 340 may determine whether or not the item that has just been placed in the storage space is an overload item based on the temperature of the item (that is, the temperature of the item measured before the item is placed in the storage space). Specifically, the processor 340 may receive the temperature of the item from a temperature measurement device (e.g., an infrared thermometer), and based on the temperature of the item and an image of the item captured by the camera mounted in the storage compartment 310 or the door 320, may determine whether or not the item is an overload item. Here, the processor 340, for example, may determine whether or not the item is an overload item based on a result of applying the pre-trained machine learning-based overload item determination model to the image of the item and the temperature of the item. The temperature measurement device may be a device provided in the refrigerator or a separate device from the refrigerator.

The processor 340 may determine whether or not the item is an overload item based on the image of the item and the temperature of the item measured before the item is added to the storage space. Accordingly, even the same kind of items may lead to different determination results. For example, even when it is determined using an image of an item that the item is an overload item, the processor 340 may consider the temperature of the item together with the image of the item. By doing so, the processor 340 may determine that the item is not an overload item based on a determination that the temperature of the item (for example, bottled water that had been stored in a refrigerator in a supermarket) is below a predetermined temperature, or based on a result of applying the overload item determination model (that has been pre-trained based on images and temperatures of items, for example) to the temperature of the item. Accordingly, even when the temperature of an item is unusually high due to, for example, the distribution environment of the item, the processor 340 may be able to determine whether or not the item is an overload item.

In addition, the processor 340 may generate a bar code image of an item by capturing a bar code on the item using the camera mounted in the storage compartment 310 or the door 320 and analyze the generated bar code image to generate bar code information, or may receive the bar code image or the bar code information of the item from a user terminal (for example, a smartphone). Then, the processor 340 may obtain item information corresponding to the bar code information from the server. Here, the processor 340 may determine whether or not the item is an overload item based on the item information (for example, at least one of the kind, size, or volume of the item). Here, the processor 340 may determine whether or not the item is an overload item based on a result of applying the pre-trained machine learning-based overload item determination model (for example, an overload item determination model that has been pre-trained based on item information) to the item information.

As another example of determining whether the item is an overload item, the processor 340 may determine whether or not the item is an overload item based on a temperature change in the storage space over a predetermined period of time starting from a time point when the item was added to the storage space.

Specifically, the processor 340 may determine whether or not the item is an overload item based on a temperature change in the storage space over a predetermined period of time (for example, three minutes) starting from a time point when the placement of the item was recognized. That is, the processor 340 may compare, with a preset reference temperature, the difference between a temperature of the item that is measured when the item is placed in the storage space and a temperature of the item that is measured when a predetermined time has passed after the item was placed in the storage space. Then, based on a result of the comparison, the processor 340 may determine whether or not the item is an overload item. For example, based on confirming that the difference between the temperature of the item that was measured when the item was added to the storage space and the temperature of the item that is measured when the predetermined time has passed is greater than the preset reference temperature, the processor 340 may determine that the item is an overload item.

Furthermore, the processor 340 may determine whether or not the item is an overload item based on a temperature change rate of the storage space over a predetermined period of time starting from the time point when the placement of the item was recognized. Here, the processor 340 may periodically (for example, every second) check the temperature change of the storage space over a predetermined period of time (for example, three minutes) starting from the time point when the placement of the item was recognized, and by doing so, may continuously calculate the temperature change rate. Here, the processor 340 may compare, with a predetermined rate, the calculated temperature change rate, and based on a result of the comparison, may determine whether or not the item is an overload item. For example, the processor 340 may determine that the item is an overload item based on confirming that the calculated temperature change rate is greater than the predetermined rate.

Meanwhile, even if the predetermined period of time (for example, three minutes) has not passed, the processor 340 may determine whether or not the item is an overload item based on confirming that the calculated temperature change rate is greater than the predetermined rate. By doing so, the processor 340 may quickly determine whether or not the item is an overload item without having to wait until the predetermined period of time has passed to calculate the temperature change rate. That is, without having to wait three minutes to calculate the temperature change rate, the processor 340 may, for example, be able to determine that the item is an overload item based on confirming that the temperature change rate calculated within two minutes is greater than the predetermined rate.

Thereafter, the processor 340 may, in response to the result of the determination that the item is an overload item, check an overload degree of the item (for example, "high," "medium," and "low"), and then based on the checked overload degree of the item, may control a drive power of the compressor. For example, based on confirming that the overload degree of the item is "medium," the processor 340 may change the drive frequency of the compressor to correspond to the overload degree of "medium." By doing so, the compressor 340 may adjust the freezing capacity provided by the compressor in accordance with the overload degree of "medium," to thereby lower the temperature of the storage space.

In addition, the processor 340 may predict opening and closing of the door based on a door opening and closing pattern model. Here, the door opening and closing pattern model may be a machine learning-based learning model, which is pre-trained to: analyze an opening and closing pattern of the door based on recognizing that the door is opened and closed at the same times over a predetermined period of time; and based on the analyzed opening and closing pattern of the door, predict an opening and closing time of the door.

The processor 340 may change the drive frequency of the compressor within a predetermined time before the predicted opening and closing time of the door. By doing so, the processor 340 may lower the temperature of the storage space in advance, to thereby reduce the impact of the temperature change that will be caused by the opening and closing of the door.

In addition, the processor 340 may check a time interval during which the door is not opened for more than a predetermined period of time (e.g., at night) based on the door opening and closing pattern model, and change the drive frequency of the compressor to correspond to a sleep mode during the time interval. By doing so, power consumption may be reduced while not spoiling items that are stored in the storage space. By contrast, during a time interval when the door is ordinarily opened and closed, excluding the night time, for example, the processor 340 may control the drive frequency of the compressor to correspond to a normal mode.

The memory 350 may be operably connected to the processor 340, and store therein at least one code related to an operation performed in the processor 340. In addition, the memory 350 may further store therein at least one of the overload item determination model or the door opening and closing pattern model.

Furthermore, the memory 350 may perform a function of permanently or temporarily storing data that are processed by the processor 340. Here, the memory 350 may include a magnetic storage media or a flash storage media. However, the present disclosure is not limited thereto. The memory 350 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

Figure 4:
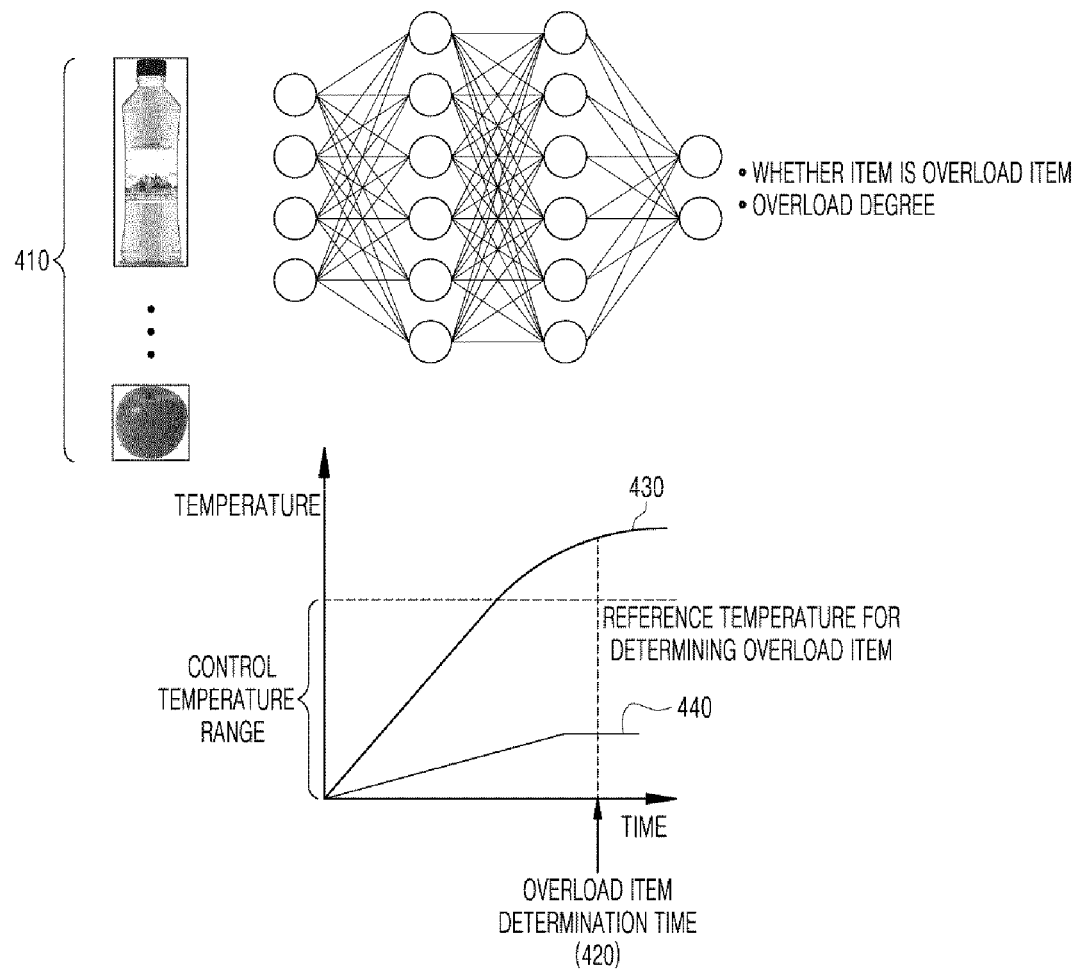
FIG. 4 is a view for explaining an example of generation of an overload item determination model in a refrigerator according to an embodiment of the present disclosure.

FIG. 4 is a view for explaining an example of generation of an overload item determination model in a refrigerator according to an embodiment of the present disclosure.

Referring to FIG. 4, the refrigerator 110 (or the server) may pre-train the overload item determination model through machine learning to determine whether an item is an overload item and an overload degree (for example, "high," "medium," and "low") of an overload item based on a temperature change in the storage space in the refrigerator 110 over a predetermined period of time, using more than a preset number of images 410 of items as training data. Here, the refrigerator may use, as the training data, the images 410, which are an input, and may use, as labels, whether an item is an overload item and an overload degree of the item, which are an output. The input may not be limited to the images 410 of items, but may further include at least one of the temperature of the item measured before the item is placed in the storage space of the refrigerator, the current temperature of the storage space, the control temperature (fixed temperature) desired to be maintained in the storage space, the outside temperature, the opening time of the door, the kind of the item, the size of the item, or the volume of the item.

The pre-trained machine learning-based overload item determination model may be stored in the memory of the refrigerator.

Thereafter, in response to recognizing placement of an item in the storage space, the refrigerator may generate an image by capturing the item using a camera that is mounted in the storage compartment or the door of the refrigerator, and then based on a result of applying the overload item determination model, which is obtained from the memory, to the image, may immediately determine whether or not the item is an overload item and the overload degree of the item. That is, the refrigerator may immediately determine whether the item that has just been placed in the storage space is an overload item of type A 430, which, when placed in the storage space, causes the temperature in the storage space to go beyond a control temperature range for a predetermined period of time (for example, for a time until an overload item determination time 420), or whether the item is a non-overload item of type B 440, which, when placed in the storage space, does not cause the temperature in the storage space to go beyond the control temperature range for the predetermined period of time. By doing so, the refrigerator may be able to quickly adjust the temperature of the storage space based on a result of the determination.

Figure 5:
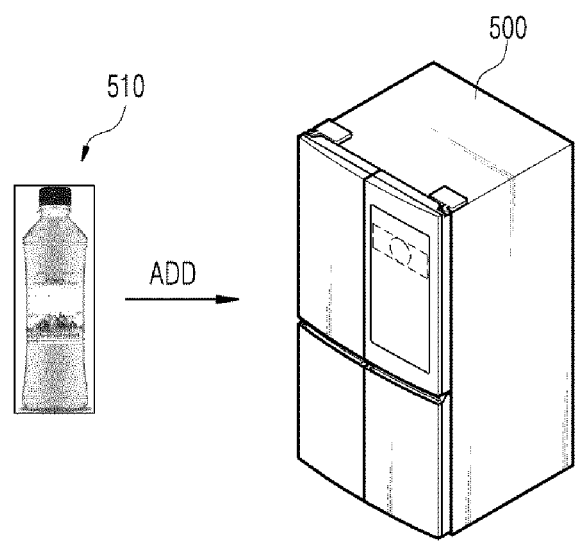
FIG. 5 is a view for explaining an example of adjusting the temperature of a storage space in response to placement of an item in the storage space in a refrigerator according to an embodiment of the present disclosure.
Figure 6:
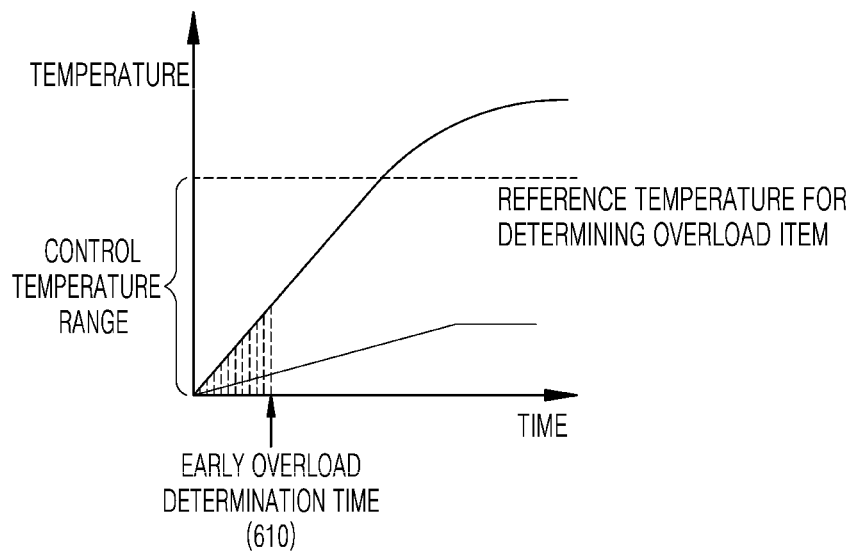
FIG. 6 is a view for explaining an example of determining whether an item is an overload item in a refrigerator according to an embodiment of the present disclosure.

FIG. 5 is a view for explaining an example of adjusting the temperature of a storage space in response to placement of an item in the storage space in a refrigerator according to an embodiment of the present disclosure. FIG. 6 is a view for explaining an example of determining whether an item is an overload item in a refrigerator according to an embodiment of the present disclosure.

Referring to FIG. 5, a refrigerator 500 may, in response to recognizing placement of an item in a storage space therein, determine whether the item is an overload item, and based on a result of the determination, adjust the temperature of the storage space.

For example, in response to recognizing placement of a bottle of water 510 in the storage space, the refrigerator 500 may generate an image by capturing the bottle of water 510 using a camera that is mounted in the storage space or a door of the refrigerator 500. Then, the refrigerator 500 may apply a pre-trained machine learning-based overload item determination model to the captured image of the bottle of water 510, and based on a result of the application, may determine whether or not the item is an overload item. Thereafter, based on a determination that the bottle of water 510 is an overload item, the refrigerator 500 may control driving of a compressor that provides the storage space with freezing capacity, in order to lower the temperature of the storage space. Here, in response to the determination that the bottle of water 510 is an overload item, the refrigerator 500 may check an overload degree of the bottle of water 510, and then based on the overload degree, control a drive power of the compressor. For example, based on confirming that the overload degree of the bottle of water 510 is "medium," the refrigerator 500 may change a drive frequency of the compressor to correspond to the overload degree of "medium." By doing so, the refrigerator 500 may adjust the freezing capacity provided by the compressor in accordance with the overload degree of "medium," to thereby lower the temperature of the storage space. Here, based on the temperature change in the storage space, the refrigerator 500 may control a drive time of the compressor at the drive frequency that has been changed in accordance with the overload degree of "medium."

As another example, in response to recognizing placement of a bottle of water 510 in the storage space, the refrigerator 500 may determine whether or not the bottle of water 510 is an overload item based on the temperature change in the storage space over a predetermined period of time starting from a time point when the placement of the bottle of water 510 was recognized, and then based on the determination, may control the driving of the compressor that provides the storage space with freezing capacity, in order to adjust the temperature of the storage space.

For example, as illustrated in FIG. 6, the refrigerator 500 may check the temperature change in the storage space for a predetermined period of time (for example, until an early overload determination time 610) starting from a time point when the placement of the bottle of water 510 in the storage space was recognized. In addition, based on confirming that the difference between a temperature of the storage space that is measured when the bottle of water 510 has just been placed in the storage space and a temperature of the storage space that is measured at the early overload determination time 610 is greater than a preset reference temperature, the refrigerator 500 may determine that the bottle of water 510 is an overload item.

In addition, the refrigerator 500 may periodically check the temperature change of the storage space over a predetermined period of time (for example, until the early overload determination time 610) starting from the time point when the placement of the bottle of water 510 was recognized, and based on the periodically checked temperature change of the storage space, may continuously calculate a temperature change rate of the storage space. Here, based on confirming that the calculated temperature change rate is greater than a predetermined rate, the refrigerator 500 may determine that the bottle of water 510 is an overload item.

Meanwhile, even before the early overload determination time 610, the refrigerator 500 may quickly determine that the bottle of water 510 is an overload item based on confirming that the calculated temperature change rate is greater than a predetermined rate.

Figure 7:
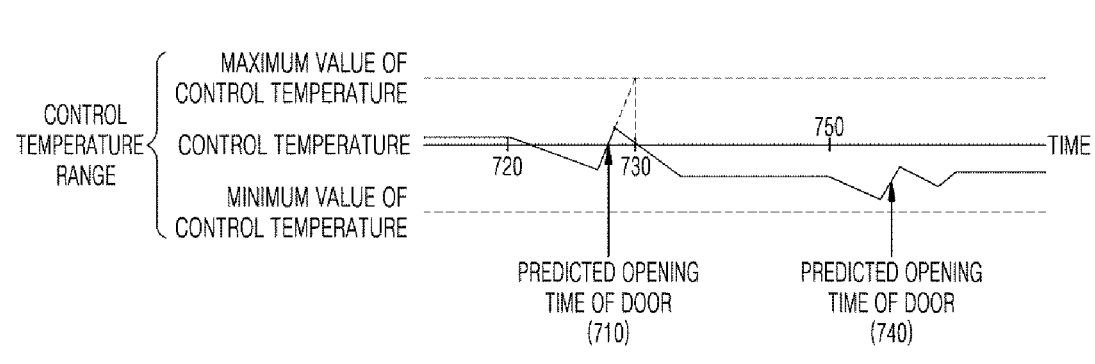
FIG. 7 is a view for explaining an example of adjusting the temperature of the storage space by using a door opening and closing pattern model in a refrigerator according to an embodiment of the present disclosure.

FIG. 7 is a view for explaining an example of adjusting the temperature of the storage space by using a door opening and closing pattern model in a refrigerator according to an embodiment of the present disclosure.

Referring to FIG. 7, the refrigerator (or the server) may pre-train a door opening and closing pattern model through machine learning to analyze an opening and closing pattern of the door based on recognizing openings and closings of the door over a predetermined period of time, and based on the analyzed opening and closing pattern of the door, predict an opening and closing time of the door. For example, based on recognizing openings and closings of the door over a period of three weeks, the refrigerator may analyze the opening and closing pattern of the door to find that opening and closing of the door occurs at the same times (for example, at the same time on the same day of the week) on three occasions over the three weeks. Then, the refrigerator may pre-train the door opening and closing pattern model through machine learning to predict an opening and closing time of the door.

The pre-trained machine learning-based door opening and closing pattern model may be stored in the memory of the refrigerator.

Thereafter, the refrigerator may predict opening and closing of the door (or opening of the door) based on the door opening and closing pattern model obtained from the memory. The refrigerator may prevent a rapid increase in the temperature of the storage space caused by opening of the door, by changing the drive frequency of the compressor within a predetermined period of time before a predicted opening and closing time of the door.

The refrigerator may, for example, change the drive frequency of the compressor within a predetermined time (for example, three minutes) before a predicted opening time 710 of the door (or a predicted opening and closing time of the door). That is, the refrigerator may, for example, change the drive frequency of the compressor at a first time point 720 (for example, two minutes before the predicted opening time 710 of the door). Accordingly, in contrast to existing techniques in which the drive frequency of the compressor is changed at a time point 730, which is the time point when the temperature of the storage space reaches the maximum value of the control temperature after the predicted opening time 710 of the door, the refrigerator according to the present disclosure may control the freezing capacity provided by the compressor by changing the drive frequency of the compressor in advance in preparation for a predicted opening of the door. By doing so, the refrigerator may preemptively adjust the temperature of the storage space (e.g., a precooling period), to thereby reduce the impact of the temperature change in the storage space caused by the opening of the door.

The control temperature (for example, 2 degrees) may be a temperature predetermined to keep the temperature of the storage space constant, but the temperature of the storage space may in fact vary between a minimum value of the control temperature (for example. 1.5 degrees) and the maximum value of the control temperature (for example, 2.5 degrees).

Likewise, when a predicted opening time 740 of the door is confirmed, the refrigerator may change the drive frequency of the compressor within a predetermined time before the predicted opening time 740 of the door. That is, the refrigerator may change the drive frequency of the compressor at a second time point 750 (for example, one minute before the predicted opening time 740 of the door the refrigerator can execute a precooling operation).

As another example, the refrigerator may adjust the time point of changing the drive frequency of the compressor based on the temperature of the storage space measured at a time point when the predicted opening time of the door is confirmed. Specifically, in a situation in which the temperature of the storage space measured at the time when the predicted opening time of the door is confirmed is relatively high, the refrigerator may change the drive frequency of the compressor at an earlier time before the predicted opening time of the door than in a situation in which the temperature of the storage space is relatively low. Referring to FIG. 7, for example, the refrigerator may change the drive frequency of the compressor one minute before the predicted opening time 740 of the door based on the temperature of the storage space measured at the time point when the predicted opening time 740 of the door was confirmed. By contrast, the refrigerator may change the drive frequency of the compressor two minutes before the predicted opening time 710 of the door based on the temperature of the storage space measured at the time point when the predicted opening time 710 of the door was confirmed.

Figure 8:
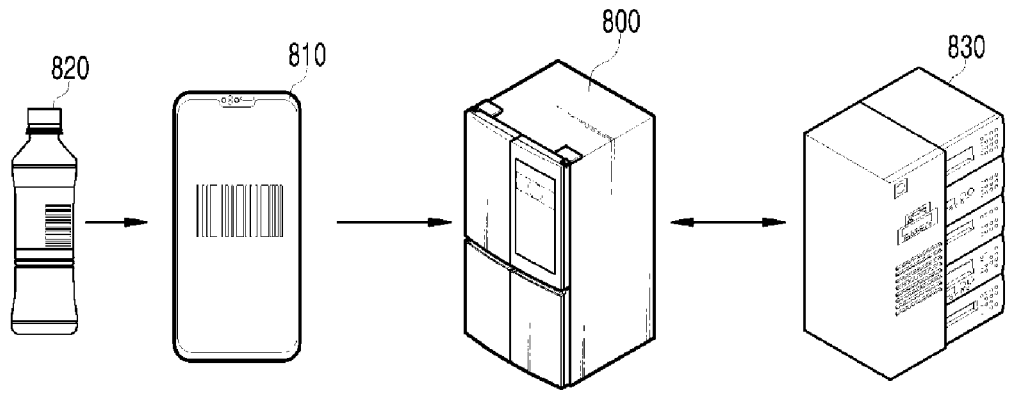
FIG. 8 is a view for explaining another example of determining whether an item is an overload item in a refrigerator according to an embodiment of the present disclosure.

FIG. 8 is a view for explaining another example of determining whether an item is an overload item in a refrigerator according to an embodiment of the present disclosure.

Referring to FIG. 8, a refrigerator 800 may receive, from a user terminal 810, a bar code image or bar code information of an item 820 that is placed in a storage space of the refrigerator 800, or the refrigerator 800 may generate a bar code image by capturing a bar code on the item 820 using at least a camera (for example, a camera mounted in a storage compartment or a door of the refrigerator), analyze the generated bar code image, and generate bar code information.

The refrigerator 800 may obtain item information corresponding to the bar code information from a server, determine whether the item 820 is an overload item based on the item information, and control the driving of a compressor of the refrigerator 800 in order to adjust the temperature of the storage space based on a result of the determination. Here, the item information may include, for example, at least one of the kind ("C" bottled water), size, or volume (500 ml) of the item.

The refrigerator 800 may determine whether or not the item is an overload item based on a result of applying a pre-trained machine learning-based overload item determination model to the item information.

Figure 9:
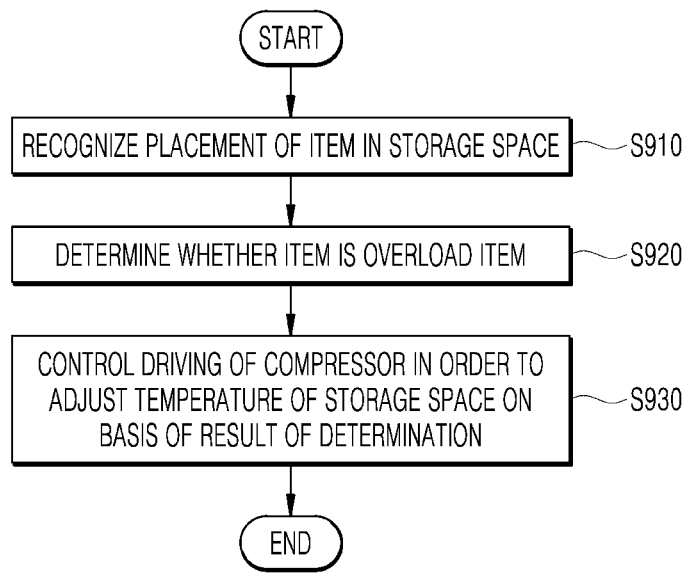
FIG. 9 is a flow chart illustrating a method for controlling a refrigerator according to an embodiment of the present disclosure.

FIG. 9 is a flow chart illustrating a method for controlling a refrigerator according to an embodiment of the present disclosure. Here, the refrigerator of the present disclosure may pre-store a pre-trained machine learning-based overload item determination model and a door opening and closing pattern model in the memory thereof. Here, the overload item determination model may be a machine learning-based learning model that is pre-trained to determine whether an item is an overload item and an overload degree of an item based on a temperature change in the storage space over a predetermined period of time, using more than a preset number of images of items as training data. Here, apart from images of items, the training data may further include at least one of the temperature of the item measured before the item is placed in the storage space of the refrigerator, the current temperature of the storage space, the control temperature (fixed temperature) desired to be maintained in the storage space, the outside temperature, the opening time of the door, the kind of the item, the size of the item, or the volume of the item.

In addition, the door opening and closing pattern model may be a machine learning-based learning model that is pre-trained to analyze an opening and closing pattern of the door based on recognizing that the door is opened and closed at the same times over a predetermined period of time, and based on the analyzed opening and closing pattern of the door, predict an opening and closing time of the door.

Referring to FIG. 9, in S910, the refrigerator may recognize placement of an item in the storage space in the storage compartment to which a door is coupled.

In S920, the refrigerator may, in response to recognizing the placement of the item in the storage space, determine whether the item is an overload item.

Specifically, the refrigerator may generate an image by capturing the item using a camera that is mounted in the storage compartment or the door, and based on a result of applying the pre-trained machine learning-based overload item determination model to the image, determine whether or not the item is an overload item.

In addition, the refrigerator may receive the temperature of the item from a temperature measurement device or temperature sensor, and based on the temperature of the item and the image of the item captured by the camera, may determine whether or not the item is an overload item. Here, the refrigerator may determine whether or not the item is an overload item based on a result of applying the pre-trained machine learning-based overload item determination model to the image and temperature of the item.

In addition, the refrigerator may analyze a bar code image of the item generated by capturing a bar code on the item using the camera to generate bar code information, or may receive the bar code image or the bar code information of the item from a user terminal (for example, a smartphone), and obtain item information corresponding to the bar code information from the server. Thereafter, the refrigerator may determine, based on the obtained item information, whether the item is an overload item. Here, the item information may include at least one of the kind of the item, the size of the item, or the volume of the item. Here, the refrigerator may determine whether or not the item is an overload item based on a result of applying the pre-trained machine learning-based overload item determination model to the item information.

As another example of determining whether the item is an overload item, the refrigerator may determine whether or not the item is an overload item based on a temperature change in the storage space over a predetermined period of time starting from a time point when the item is added to the storage space.

Specifically, the refrigerator may determine whether or not the item is an overload item based on a temperature change in the storage space over a predetermined period of time starting from a time point when the placement of the item is recognized.

In addition, the refrigerator may determine whether or not the item is an overload item based on a temperature change rate of the storage space over a predetermined period of time starting from the time point when the placement of the item was recognized.

In S930, based on the determination of whether the item is an overload item, the refrigerator may control the driving of the compressor that provides the storage compartment with freezing capacity, in order to adjust the temperature of the storage space.

Here, in response to a determination that the item is an overload item, the refrigerator may check an overload degree of the item, and control a drive power of the compressor based on the overload degree of the item.

Meanwhile, the refrigerator may predict opening and closing of the door, based on the door opening and closing pattern model. Here, the refrigerator may change the drive frequency of the compressor within a predetermined period of time before a predicted opening and closing time of the door.

In addition, the refrigerator may check a time interval during which the door is not opened for more than a predetermined period of time based on the door opening and closing pattern model, and change the drive frequency of the compressor to correspond to a sleep mode during the time interval.

The above-described embodiments of the present disclosure can be implemented as a computer program that can be executed on a computer using various components, and the computer program can be stored in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure, or they may be of the kind well known and available to those skilled in the computer software arts. Examples of the computer programs may include both machine codes, such as produced by a compiler, and higher level language codes that may be executed by the computer using an interpreter.

As used in the present disclosure (particularly in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A refrigerator comprising:
   a storage compartment having a storage space and an opening;
   at least one door coupled to the storage compartment to open and close a part of the storage compartment;
   a compressor configured to provide the storage compartment with freezing capacity or cooling capacity;
   a processor configured to control driving of the compressor; and
   a memory operably connected to the processor and configured to store at least one code executable by the processor,
   wherein the memory stores codes configured to, when executed by the processor, cause the processor to:
      in response to recognizing placement of an item in the storage space, capture an image of the item by a camera mounted in the storage compartment or the door and measure an initial temperature of the item before the item is added to the storage space,
      obtain item information of the item including a volume of the item based on the image,
      input the volume of the item, the initial temperature, and the image of the item into a pre-trained overload item determination model to generate a determination result based on the volume of the item, the initial temperature and the image, and
      control the driving of the compressor to adjust a temperature of the storage space based on the determination result.

2. The refrigerator of claim 1, wherein the codes are configured to, when executed by the processor, further cause the processor to:
   when the initial temperature of the item is not received, and the image of the item is a barcode image of the item, generate bar code information of the item based on the image of the barcode on the item;
   obtain item information corresponding to the bar code information from a server; and
   determine whether the item is the overload item based on the item information.

3. The refrigerator of claim 1, wherein the codes are configured to, when executed by the processor, when the initial temperature of the item and the image of the item are not received, further cause the processor to determine whether the item is the overload item based on a temperature change amount in the storage space exceeding a preset reference temperature or a preset reference amount of temperature change, the temperature change amount occurring over a period of time starting from a time point of when the placement of the item in the storage space was recognized by the processor.

4. The refrigerator of claim 1, wherein the codes are configured to, when executed by the processor, when the initial temperature of the item and the image of the item are not received, further cause the processor to determine whether the item is the overload item based on a rate of change of the temperature of the storage space exceeding a predetermined rate of change.

5. The refrigerator of claim 1, wherein the codes are configured to, when executed by the processor, further cause the processor to:
   in response to determining that the item is the overload item, receive an overload degree of the item; and
   control a drive power of the compressor based on the overload degree of the item.

6. The refrigerator of claim 1, wherein the codes are configured to, when executed by the processor, further cause the processor to predict an opening time or a closing time of the door based on a door opening and closing pattern model, and
   wherein the door opening and closing pattern model is a machine learning-based learning model pre-trained to:
      analyze a pattern of opening and closing of the door over a predetermined period of time to generate an analysis result; and
      generate a predicted opening time of the door based on the analysis result.

7. The refrigerator of claim 6, wherein the codes are configured to, when executed by the processor, further cause the processor to change a drive frequency of the compressor within a predetermined time period before the predicted opening time of the door.

8. The refrigerator of claim 6, wherein the codes are configured to, when executed by the processor, further cause the processor to:
   determine a time interval during which the door is not opened for more than a predetermined period of time based on the door opening and closing pattern model; and
   change a drive frequency of the compressor to correspond to a sleep mode based on the time interval.

9. A method of controlling a refrigerator including a processor, the method comprising:
   in response to recognizing, by the processor, placement of an item in a storage space in a storage compartment of the refrigerator to which a door is coupled, determining whether the item is an overload item to generate a determination result; and
   controlling, by the processor, driving of a compressor to adjust a temperature of the storage space based on the determination result,
   wherein the compressor provides the storage compartment with freezing capacity or cooling capacity,
   wherein the determining whether the item is the overload item comprises:
      in response to the recognizing the placement of the item in the storage space, capturing an image of the item by a camera mounted in the storage compartment or the door and measuring an initial temperature of the item before the item is added to the storage space;
      obtaining item information of the item including a volume of the item based on the image; and
      inputting the volume of the item, the initial temperature, and the image of the item into a pre-trained overload item determination model to generate the determination result based on the volume of the item, the initial temperature and the image.

10. The method of claim 9, further comprising:
    when the initial temperature of the item is not received, and the image of the item is a barcode image of the item, generating bar code information of the item based on the image of the barcode on the item;
    obtaining item information corresponding to the bar code information from a server; and determining whether the item is the overload item based on the item information.

11. The method of claim 9, further comprising:
when the initial temperature of the item and the image of the item are not received, determining whether the item is the overload item based on a temperature change amount in the storage space exceeding a preset reference temperature or a preset reference amount of temperature change, the temperature change amount occurring over a predetermined period of time starting from a time point of when the placement of the item in the storage space was recognized by the processor.

12. The method of claim 9, further comprising:
when the initial temperature of the item and the image of the item are not received, determining whether the item is the overload item based on a rate of change of the temperature of the storage space exceeding a predetermined rate of change.

13. The method of claim 9, further comprising:
in response to determining, by the processor, that the item is the overload item, receiving an overload degree of the item; and
controlling, by the processor, a drive power of the compressor based on the overload degree of the item.

14. The method of claim 9, further comprising:
predicting, by the processor, an opening time or a closing time of the door based on a door opening and closing pattern model,
wherein the door opening and closing pattern model is a machine learning-based learning model pre-trained to:
analyze a pattern of opening and closing of the door over a predetermined period of time to generate an analysis result; and
generate a predicted opening time of the door based on the analysis result.

15. The method of claim 14, further comprising:
changing, by the processor, a drive frequency of the compressor within a predetermined time period before the predicted opening time of the door.

16. The method of claim 14, further comprising:
determining, by the processor, a time interval during which the door is not opened for more than a predetermined period of time based on the door opening and closing pattern model; and
changing, by the processor, a drive frequency of the compressor to correspond to a sleep mode based on the time interval.

* * * * *